Figure 1:
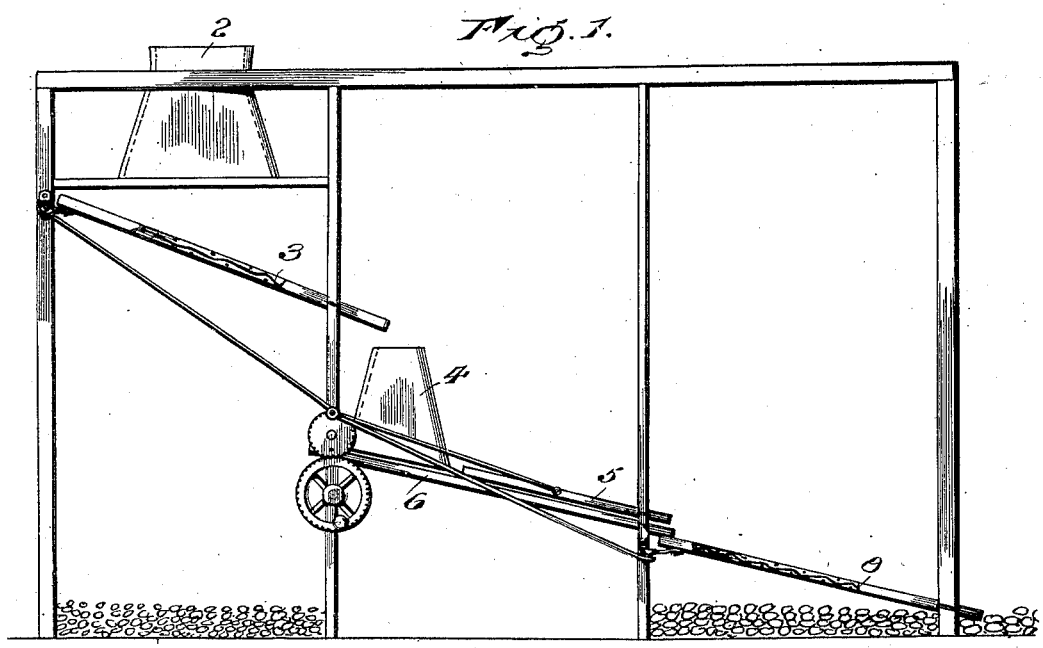

No. 704,610.  
Patented July 15, 1902.

A. R. BLACK.
PROCESS OF TREATING BEET SEED.
(Application filed Mar. 27, 1902.)

(No Model.)

Inventor  
A. R. Black.

Witnesses

By  
Attorneys

UNITED STATES PATENT OFFICE.

AMOS R. BLACK, OF LAMAR, COLORADO.

PROCESS OF TREATING BEET-SEED.

SPECIFICATION forming part of Letters Patent No. 704,610, dated July 15, 1902.

Application filed March 27, 1902. Serial No. 100,325. (No specimens.)

*To all whom it may concern:*

Be it known that I, AMOS R. BLACK, a citizen of the United States, residing at Lamar, in the county of Prowers and State of Colorado, have invented certain new and useful Improvements in Processes of Treating Beet-Seeds; and I do hereby declare the following to be a full, clear, and exact description of the invention, such as will enable others skilled in the art to which it appertains to make and use the same.

My invention relates to the preparation of sugar-beet seed to hasten germination and enable a seeder to drop and plant one beet-seed at a time a regular given distance apart in a row.

In their natural state and present marketable condition sugar-beet seed are of many different sizes and shapes incased in a nut-like shell having a rough, tenacious outer shell or hull of irregular shape with many projections and shriveled sunken spots, which formation causes beet-seed to clog or bridge in the feed-box and also necessarily prolongs the period of germination. The above conditions in connection with the great difference in the size of the seeds, some being from five to six times larger than others, make it an absolute impossibility for any seeder to regularly drop and plant one sugar-beet seed at a time a regular given distance apart in the row.

The present practice in planting sugar-beet seed for field crops for sugar factories is to sow or drill them close together in rows. After the seeds have germinated and the plants are up, say, three to four inches the row of plants is then thinned, first by cutting out spaces and leaving from three to four beet-plants standing in a clump or bunch between the spaces so cut out. These clumps or bunches must then be very carefully thinned by hand by pulling up all but one plant, so as to leave but one beet-plant standing every four inches apart in the row. This thinning is necessary in order to furnish room for the remaining plants to grow beets the size required to produce as large a tonnage per acre as will contain the highest percentage in sugar.

The present practice in planting and cultivating a sugar-beet crop is very costly as to the outlay for the seed wasted, which amounts to fully one dollar per acre, also as to the expensive hand-thinning, which amounts to an average of five dollars per acre. The waste of seed and heavy expense of thinning can both be obviated by preparing sugar-beet seed to enable a seeder to manipulate it so as to drop and plant one seed at a time four inches apart in the row.

My process for preparing sugar-beet seed for the purpose described consists of first grading or sizing beet-seed in its natural state as now marketed to eliminate the smaller classes from the intermediate and larger classes, retaining only fully-matured seed. The small-sized product thus obtained is dispensed with. This first step may be performed by either rotary or shaking screens or other appliances. The balance of the seed is next subjected to a wearing, scouring, or abrasive action which removes all the rough projections from the seed, also all or a part of the outer hull, reducing the seed to an approximately symmetrical and rounded form, which prevents beet-seed from clogging or bridging in the feed-box and also hastens the germination. The product is then screened again to eliminate the projections, hulls, or chaff that was removed from the seed by the scouring process.

The grading or sifting and scouring of the seed can be accomplished in any way—as, for instance, by the mechanism illustrated in the accompanying drawings, in which—

Figure 2:
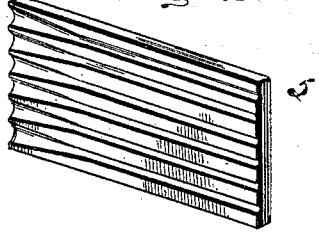
Figure 3:
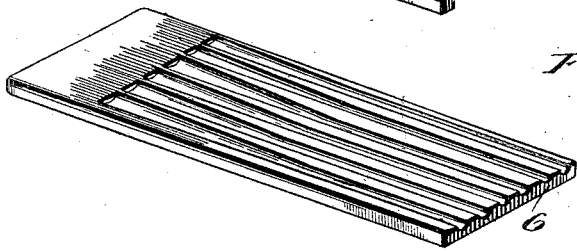

Figure 1 is a side view. Fig. 2 is a perspective view of the rubber-plate, and Fig. 3 is a perspective view of the bed-plate.

In practicing the invention in connection with the mechanism illustrated the seed is fed into the hopper 2 and falls onto and passes over the inclined shaking-screen 3, where the small and unmatured classes are eliminated. The balance of the seed passes from the inclined screen 3 into the feed-box 4, thence between the inclined grooved plates 5 and 6, the bed-plate 6 being stationary and the rubber-plate 5 movable. The longitudinal grooves in the plates 5 and 6 are largest at the upper end and taper smaller to the center of the plates 5 and 6. From the center to the lower end the grooves are of uniform size. When the seed is passing between the plates 5 and 6, (in the grooves,) the sliding movement of the rubber-plate 5 removes the projections and a part or all of the rough outer hull from the seed, rendering the seed of an approximately round form and an approximately uniform size. The product then passes onto and over the inclined shaking-screen 8, where the projections, hulls, or chaff which were removed from the seed by the plates 5 and 6 are eliminated and the seeds prepared for planting are discharged over the lower end of the shaking-screen 8.

The foregoing-described process of sizing and scouring sugar-beet seed furnishes a new and useful commercial product and enables a sugar-beet seeder to perform a new and useful result.

Having thus described my invention, what I claim as new, and desire to secure by Letters Patent, is—

The process of treating sugar-beet seed to hasten the period of germination and enable a seeder to drop and plant one seed at a time a given distance apart in the row, consisting of sizing and scouring the seed to render them approximately uniform in size and of an approximately round form, substantially as described.

In testimony whereof I affix my signature in presence of two witnesses.

AMOS R. BLACK. [L. S.]

Witnesses:
GLADYS L. THOMPSON,
GENEVIEVE MATTHEWS.